US009081159B2

(12) United States Patent
Yanagisawa et al.

(10) Patent No.: US 9,081,159 B2
(45) Date of Patent: Jul. 14, 2015

(54) OPTICAL WAVEGUIDE AND METHOD OF MANUFACTURING THE SAME, AND OPTICAL WAVEGUIDE DEVICE

(75) Inventors: Kenji Yanagisawa, Nagano (JP); Hideki Yonekura, Nagano (JP); Takanori Yamamoto, Nagano (JP); Kazunao Yamamoto, Nagano (JP)

(73) Assignee: SHINKO ELECTRIC INDUSTRIES CO., LTD., Nagano-shi (JP)

( * ) Notice: Subject to any disclaimer, the term of this patent is extended or adjusted under 35 U.S.C. 154(b) by 714 days.

(21) Appl. No.: 13/316,810

(22) Filed: Dec. 12, 2011

(65) Prior Publication Data
US 2012/0155822 A1    Jun. 21, 2012

(30) Foreign Application Priority Data
Dec. 15, 2010    (JP) .................................. 2010-279051

(51) Int. Cl.
G02B 6/12    (2006.01)
G02B 6/43    (2006.01)
G02B 6/138    (2006.01)
G02B 6/42    (2006.01)

(52) U.S. Cl.
CPC    *G02B 6/43* (2013.01); *G02B 6/138* (2013.01); *G02B 6/4214* (2013.01); *G02B 6/4249* (2013.01)

(58) Field of Classification Search
None
See application file for complete search history.

(56) References Cited

U.S. PATENT DOCUMENTS

| 7,680,367 | B2 | 3/2010 | Matsuoka et al. |
| 7,734,124 | B2 | 6/2010 | Yonekura et al. |
| 7,991,248 | B2 * | 8/2011 | Matsuoka et al. ............. 385/14 |
| 2010/0215313 | A1 | 8/2010 | Matsuoka et al. |

FOREIGN PATENT DOCUMENTS

| JP | 2008-281816 A | 11/2008 |
| JP | 2010-191365 | 9/2010 |
| WO | 2006/054569 | 5/2006 |

OTHER PUBLICATIONS

Office Action mailed Nov. 26, 2013 from the Japanese Patent Office in counterpart application No. 2010-279051 with English translation.
Office Action mailed May 29, 2014 from the Japanese Patent Office in counterpart application No. 2010-279051 with English translation.

* cited by examiner

*Primary Examiner* — Uyen Chau N Le
*Assistant Examiner* — John M Bedtelyon
(74) *Attorney, Agent, or Firm* — Kratz, Quintos & Hanson, LLP

(57) ABSTRACT

A method of manufacturing an optical waveguide, includes forming a first light path core layer having a first light path length on a first cladding layer, forming a groove portion having an inclined surface in an end side of the first light path core layer, forming a second light path core layer having a second light path length which is longer than the first light path length, in a lateral area of the first light path core layer, forming a groove portion having an inclined surface, arranged to an outer side than the groove portion of the first light path core layer, in an end side of the second light path core layer, forming partially a metal layer on the respective inclined surfaces of the first and second light path core layer, and forming a second cladding layer covering the first and second light path core layer.

3 Claims, 15 Drawing Sheets

(plan view)

(plan view)

(plan view)

(plan view)

(plan view)

OPTICAL WAVEGUIDE AND METHOD OF MANUFACTURING THE SAME, AND OPTICAL WAVEGUIDE DEVICE

CROSS-REFERENCE TO RELATED APPLICATIONS

This application is based upon and claims the benefit of priority of the prior Japanese Patent Application No. 2010-279051, filed on Dec. 15, 2010, the entire contents of which are incorporated herein by reference.

FIELD

It is related to an optical waveguide and a method of manufacturing the same, and an optical waveguide device using the optical waveguide.

BACKGROUND

Recently, the development of the backbone network communication line as mainly focusing on the optical fiber communication technology is proceeding steadily and, in such a situation, the electronic wirings in the information terminal are becoming a bottleneck. Against such background, instead of the conventional electric circuit substrate in which all signal transmissions are made by using the electric signal, the optoelectronic composite substrate (optical waveguide device) of the type that transmits high-speed parts by the light has been proposed, in order to compensate the limit of transmission speed of the electric signal.

In the optoelectronic composite substrate, the light signal is transmitted by the optical waveguide including such a structure in which the core layer is surrounded by the cladding layers.

In an example of the optical waveguide manufacturing method, first, the lower cladding layer, the core layers, and the upper cladding layer are formed sequentially on the substrate. Then, the resultant structure is processed by a rotary blade so as to divide the core layer from the upper cladding layer, and thus the groove portion having the inclined surface inclined at an angle of 45° to the light propagation direction is formed. Then, the metal layer having light reflection property is partially formed on the groove in the core layer, and then the metal layer on the inclined surface is used as the light path conversion mirror.

Then, a light that propagates through the core layer is reflected in the vertical direction by the light path conversion mirror on the inclined surface of the groove, thus the light path is converted.

A related art is disclosed in Japanese Laid-open Patent Publication No. 2007-293244.

As explained in the column of the preliminary matter described later, there is the case in either the case where two optical devices (the light emitting element and the light receiving element) are optically coupled to both end sides of the optical waveguide by two rows respectively, or the case where the optical devices in which the light emitting portions or the light receiving portions with two rows are built in the inner part are optically coupled to them respectively. In such optical waveguide, the different light paths with two routes are prepared according to the optical devices, and the light path conversion mirrors are arranged in the different positions in every light path.

In case the optical waveguides serving as the different light paths are stacked and formed, a distance of the light path in the optical device which is optically coupled to the optical waveguide located on the lower side is set longer by a thickness of the optical waveguide located on the upper side. Therefore, an increase of an optical coupling loss is caused, and as a result enough reliability of the optical characteristics cannot be obtained.

SUMMARY

According to one aspect discussed herein, there is provided a method of manufacturing an optical waveguide, which includes forming a first light path core layer having a first light path length on a first cladding layer, forming a groove portion having an inclined surface in an end side of the first light path core layer, forming a second light path core layer having a second light path length which is longer than the first light path length, in a lateral area of the first light path core layer on the first cladding layer, forming a groove portion having an inclined surface, which is arranged to an outer side than the groove portion of the first light path core layer, in an end side of the second light path core layer, forming partially a metal layer having light reflection property on the respective inclined surfaces of the first light path core layer and the second light path core layer to obtain a light path conversion mirror, and forming a second cladding layer covering the first light path core layer and the second light path core layer.

According to another aspect discussed herein, there is provided a method of manufacturing an optical waveguide, which includes forming a first light path core layer having a first light path length on a first cladding layer, forming a groove portion having an inclined surface in an end side of the first light path core layer, forming partially a metal layer having light reflection property on the inclined surface of the first light path core layer to obtain a light path conversion mirror, forming a second light path core layer having a second light path length which is longer than the first light path length, in a lateral area of the first light path core layer on the first cladding layer, forming a groove portion having an inclined surface, which is arranged to an outer side than the groove portion of the first light path core layer, in an end side of the second light path core layer, forming partially the metal layer having light reflection property on the inclined surface of the second light path core layer to obtain a light path conversion mirrors, and forming a second cladding layer covering the first light path core layer and the second light path core layer.

According to still another aspect discussed herein, there is provided an optical waveguide, which includes a first cladding layer, a first light path core layer formed on the first cladding layer, and having a first light path length, a groove portion formed in an end side of the first light path core layer, and having an inclined surface, a second light path core layer formed in a lateral area of the first light path core layer on the first cladding layer, and having a second light path length which is longer than the first light path length, a groove portion formed in an end side of the second light path core layer, and arranged to an outer side than the groove portion of the first light path core layer, and having an inclined surface, a light path conversion mirror formed partially on the respective inclined surfaces of the first light path core layer and the second light path core layer, and formed of a metal layer having light reflection property, and a second cladding layer covering the first light path core layer and the second light path core layer.

DESCRIPTION OF EMBODIMENTS

Embodiments will be explained with reference to the accompanying drawings hereinafter.

Figure 1:
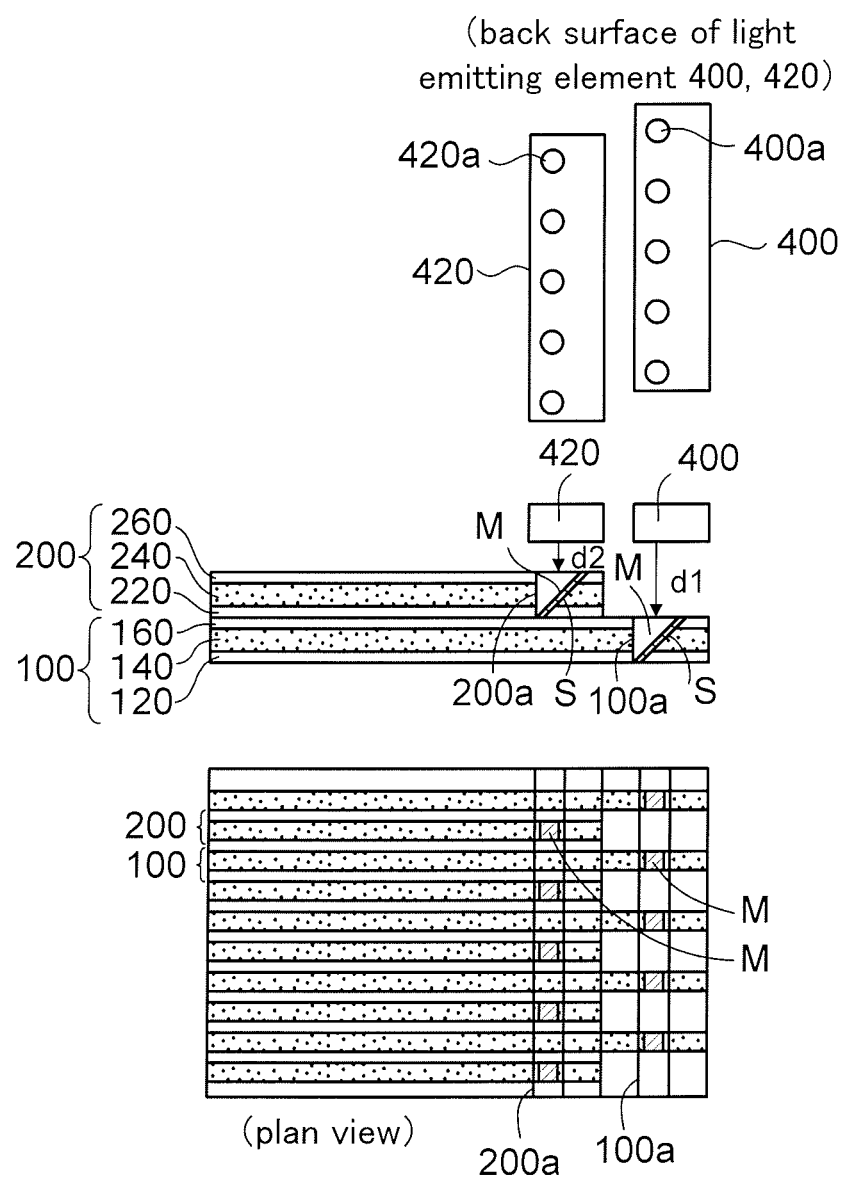
FIG. 1 is a sectional view and a plan view (#1) depicting an optical waveguide in the preliminary matter.

Prior to the explanation of embodiments, the preliminary matter will be explained hereunder. In FIG. 1, an optical waveguide device, in which two light emitting elements are arranged with two rows and are optically coupled to one end side of the optical waveguides with two routes, whose light paths are different respectively, is depicted. Actually, the light emitting element and the light receiving element are optically coupled to both end sides of the optical waveguides respectively. In FIG. 1, the area of the optical waveguide on the light input side is depicted.

As depicted in FIG. 1, a plurality of first optical waveguides 100 are arranged side by side on the lower side, and second optical waveguides 200 are stacked on the first optical waveguides 100. The second optical waveguides 200 are arranged side by side on the areas located between the first optical waveguides 100.

Each of the first optical waveguides 100 includes such a structure in which a core layer 140 is surrounded by a first cladding layer 120 and a second cladding layer 160. Similarly, each of the second optical waveguides 200 includes such a structure in which a core layer 240 is surrounded by a first cladding layer 220 and a second cladding layer 260.

A groove 100a having an inclined surface S is formed in one end side of the first optical waveguide 100 located on the lower side so as to divide the core layer 140 from the second cladding layer 160. A light path conversion mirror M formed of a metal layer having light reflection property is provided on the inclined surface S of the groove 100a.

A light path length of the second optical waveguide 200 located on the upper side is set shorter than that of the first optical waveguide 100 located on the lower side. Similarly, a groove 200a having the inclined surface S is formed in one end side of the second optical waveguide 200 so as to divide the core layer 240 from the second cladding layer 260. The light path conversion mirror M formed of a metal layer having light reflection property is provided on the inclined surface S of the groove 200a.

In this way, the position of the light path conversion mirror M of the first optical waveguide 100 located on the lower side is arranged to the outer side than the position of the light path conversion mirror M of the second optical waveguide 200 located on the upper side.

Then, a first light emitting element 400 is mounted such that its light emitting portions 400a are optically coupled to the light path conversion mirrors M of the first optical waveguides 100. Also, a second light emitting element 420 is mounted such that its light emitting portions 420a are optically coupled to the light path conversion mirrors M of the second optical waveguides 200.

By this matter, the first light emitting element 400 and the second light emitting element 420 are optically coupled to the first and second optical waveguides 100, 200 in different light paths respectively.

In the preliminary matter, the second optical waveguide 200 is stacked on the first optical waveguide 100. Therefore, a distance d1 of the light path of the first light emitting element 400 which is optically coupled to the first optical waveguide 100 becomes longer than a distance d2 of the light path of the second light emitting element 420 by a thickness of the second optical waveguide 200. As a result, an increase of an optical coupling loss in the first light emitting element 400 is caused, and thus enough reliability of the optical characteristics cannot be obtained.

Although not depicted, in two light receiving elements which are optically coupled to the light output sides of the optical waveguides, a light path of the light receiving element which is optically coupled to the first optical waveguide 100 located on the lower side becomes longer. As a result, the similar problems arise.

Figure 2:
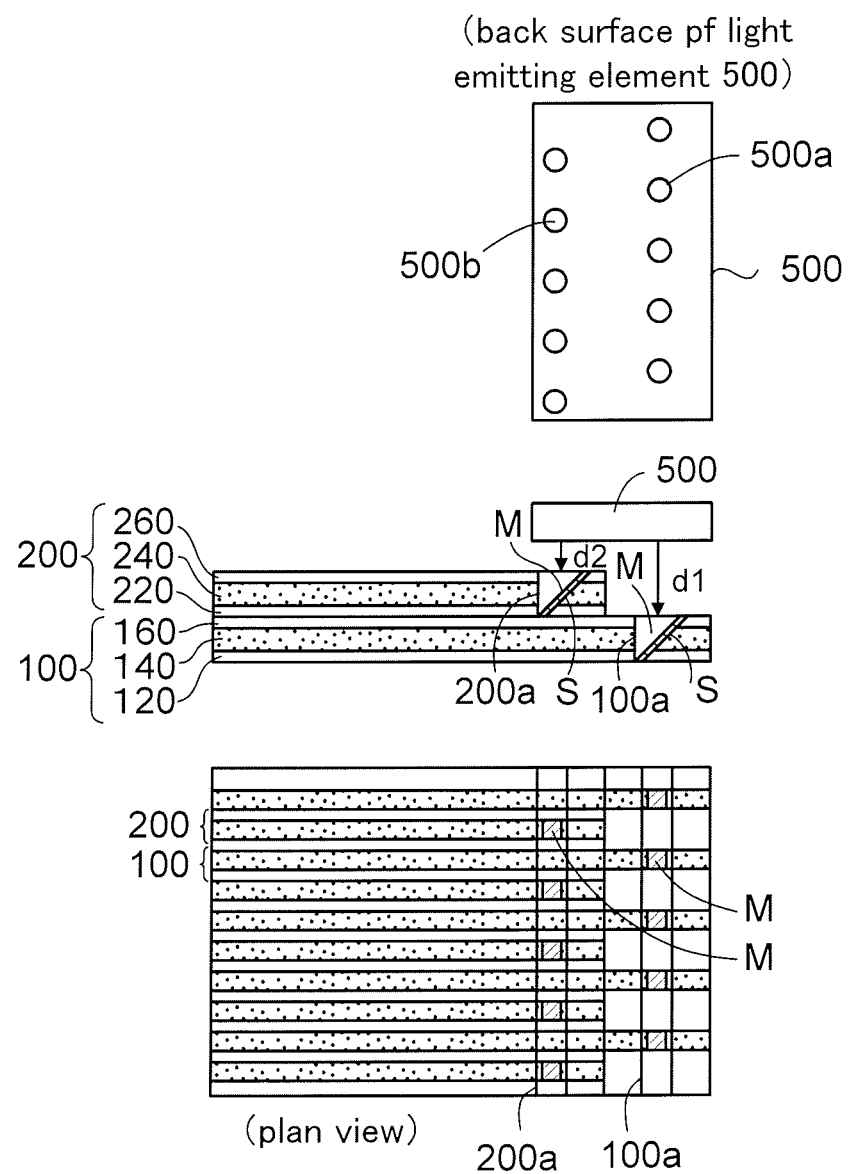
FIG. 2 is a sectional view and a plan view (#2) depicting an optical waveguide in the preliminary matter.

In FIG. 2, an example in which a light emitting element 500 in which the first and second light emitting portions are built-in by two rows is optically coupled to the optical waveguide having the identical stacked structure with that in FIG. 1, is depicted. As depicted in FIG. 2, first light emitting portions 500a and second light emitting portions 500b are arranged side by side by two rows in the light emitting element 500.

The light emitting element 500 is mounted such that its first light emitting portions 500a are optically coupled to the light path conversion mirrors M of the first optical waveguide 100 and also its second light emitting portions 500b are optically coupled to the light path conversion mirrors M of the second optical waveguide 200.

In the case that this light emitting element 500 in which such first and second light emitting portions 500a, 500b with two rows are built-in is mounted, the distance d1 of the light path of the first light emitting portion 500a becomes longer than the distance d2 of the light path of the second light emitting portion 500b by a thickness of the second optical waveguide 200. Therefore, like the case in FIG. 1, an increase of an optical coupling loss in the first light emitting portion 500a of the light emitting element 500 is caused, and thus enough reliability of the optical characteristics cannot be obtained.

Although not depicted, in the light receiving element in which the first and second light receiving portions with two rows which are optically coupled to the light output sides of the optical waveguides are built-in, a light path of the first light receiving portion which is optically coupled to the first optical waveguide 100 located on the lower side becomes longer. As a result, the similar problems arise.

In embodiments described later, such a structure can employed that the core layers with plural routes, whose light path lengths are different, are aligned on the identical surface and are formed thereon. Therefore, such a problem as described above can be solved that an increase of an optical coupling loss is caused.

First Embodiment

Figure 8:
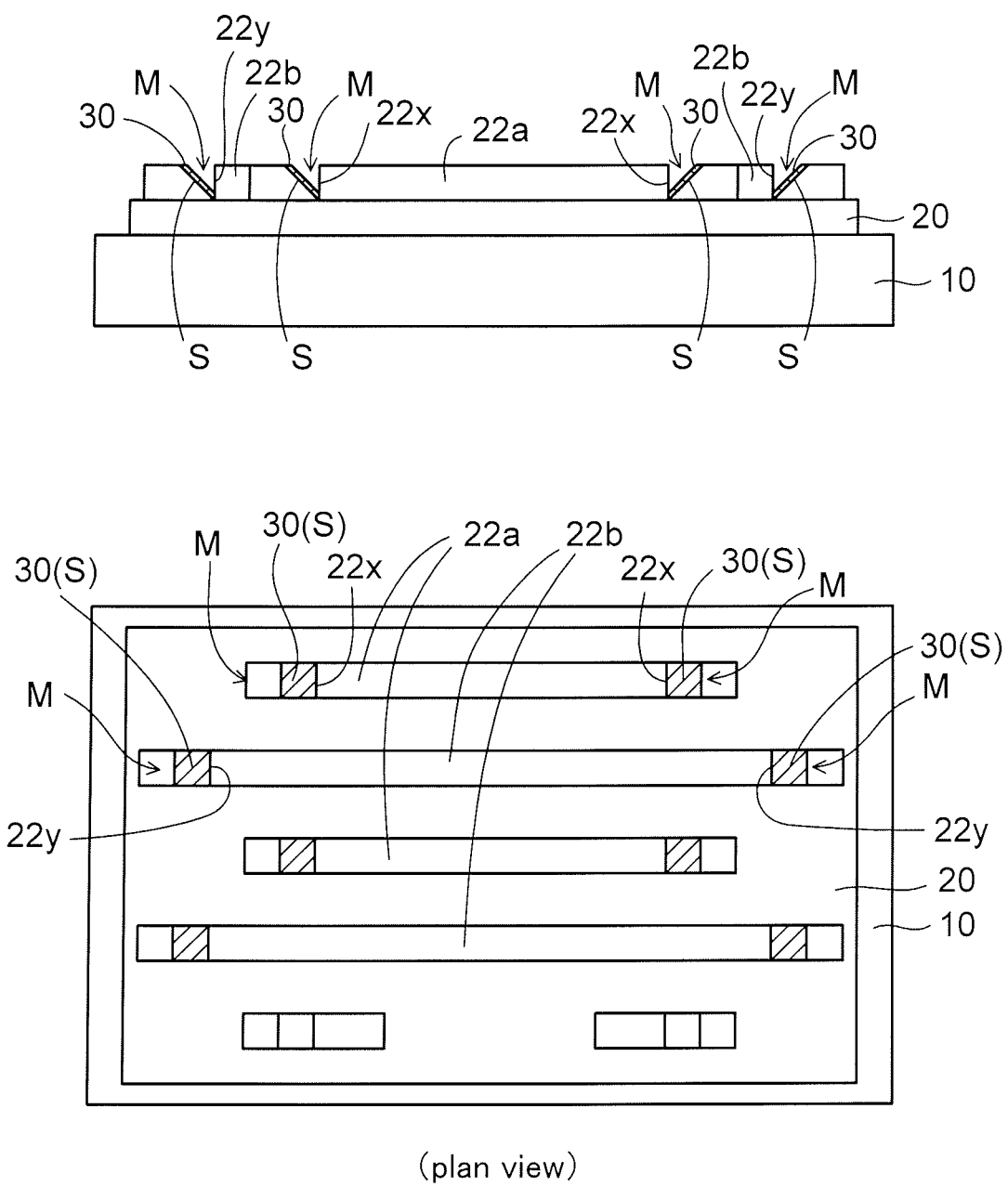
FIG. 8 is a sectional view and a plan view (#5) depicting the method of manufacturing the optical waveguide according to the first embodiment.
Figure 9:
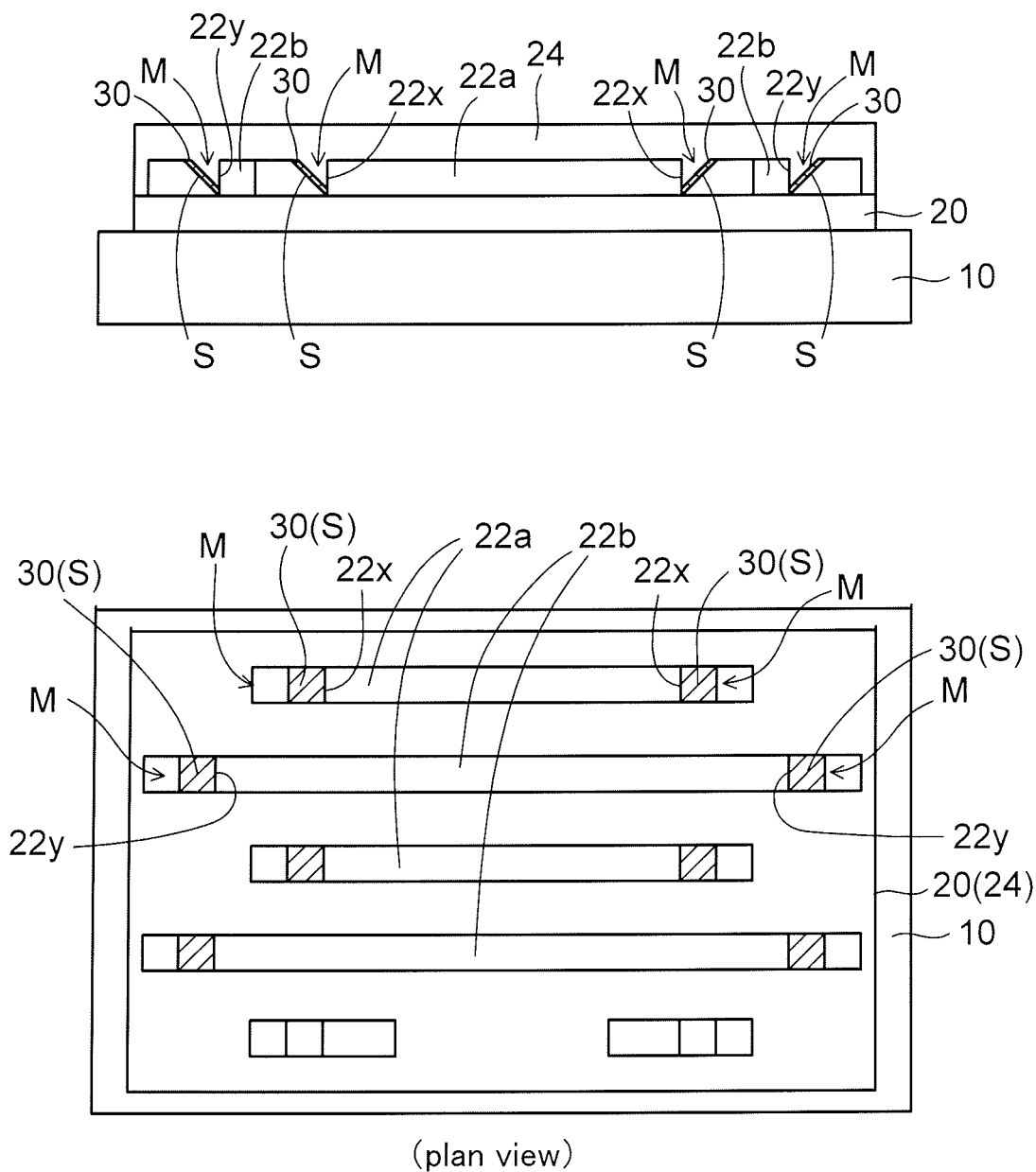
FIG. 9 is a sectional view and a plan view (#6) depicting the method of manufacturing the optical waveguide according to the first embodiment.
Figure 10:
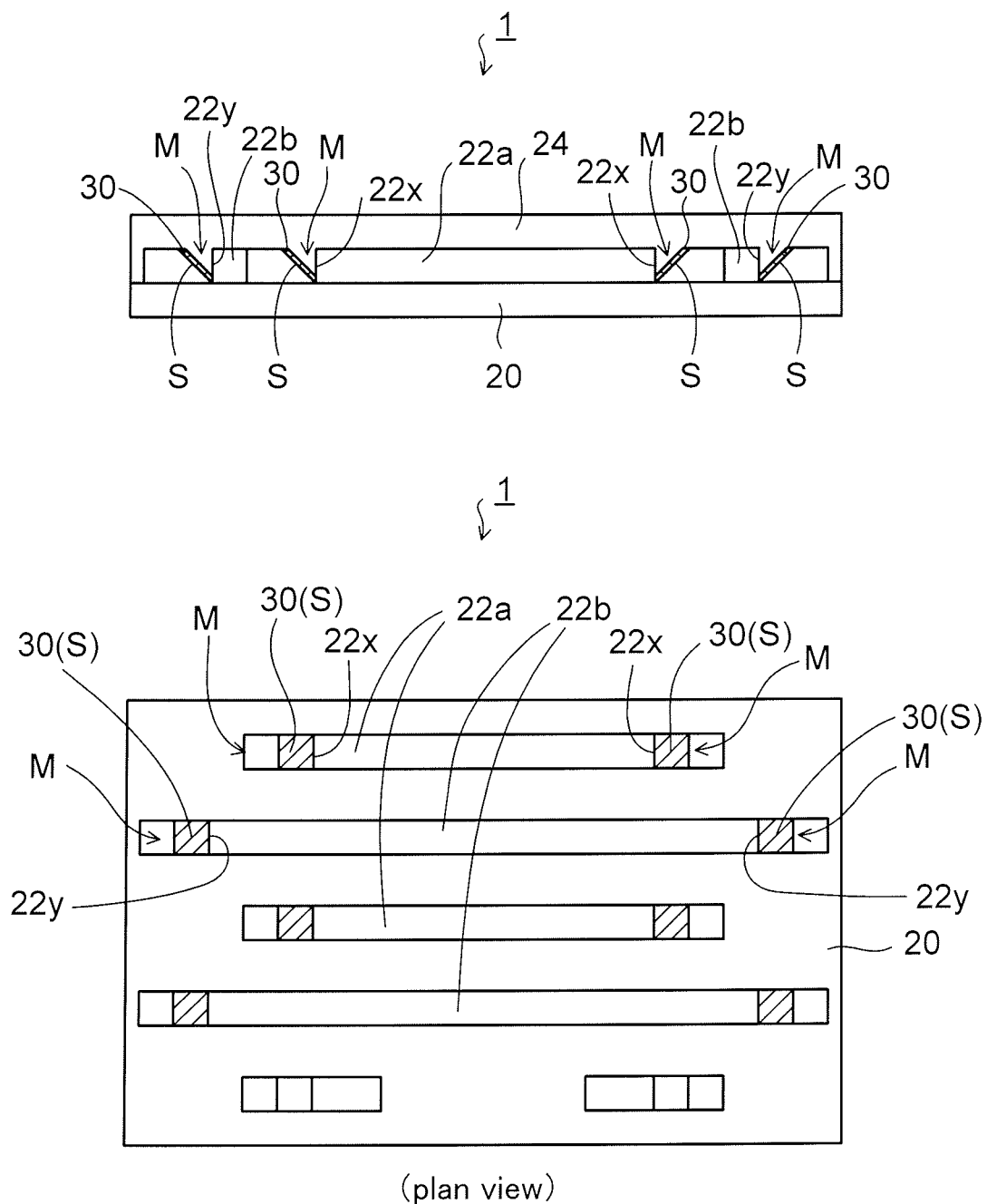
FIG. 10 is a sectional view and a plan view depicting the optical waveguide according to the first embodiment.

FIG. 3A to FIG. 9 are sectional views and plan views depicting a method of manufacturing an optical waveguide according to a first embodiment, and FIG. 10 is a sectional view and a plan view depicting the optical waveguide according to the first embodiment.

Figure 3A:
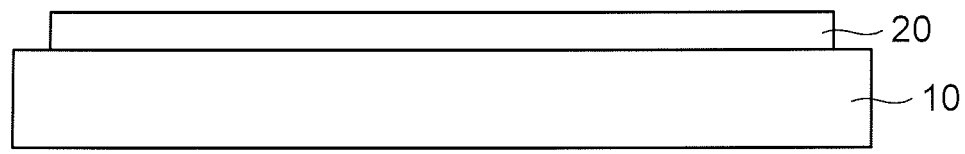
FIGS. 3A and 3B are sectional views and a plan view (#1) depicting a method of manufacturing an optical waveguide according to a first embodiment.

In the method of manufacturing the optical waveguide according to the first embodiment, as depicted in FIG. 3A, first, a substrate 10 is prepared. The substrate 10 of the present embodiment is prepared as a temporary substrate which is removed finally. This substrate 10 is formed of a polycarbonate resin, or the like that can be peeled off and be removed.

Then, a photosensitive resin layer (not shown) for obtaining a first cladding layer is formed on the substrate 10, and then is exposed/developed based on the photolithography. Then, the photosensitive resin layer is cured by applying the heating process at about 100 to 140° C. By this matter, a first cladding layer 20 is formed in an optical waveguide forming area on the substrate 10. A thickness of the first cladding layer 20 is set in a range from about 10 to 20 μm, for example.

As the photosensitive resin layer, a UV curable epoxy resin, or the like is used preferably. As the method of forming the photosensitive resin layer, a photosensitive resin sheet kept in a semi-cured state (B-stage) may be pasted, or a liquid photosensitive resin may be coated.

In the steps of forming first light path core layers, second light path core layers, and a second cladding layer, which will be described later, the similar resin is used preferably.

Figure 3B:
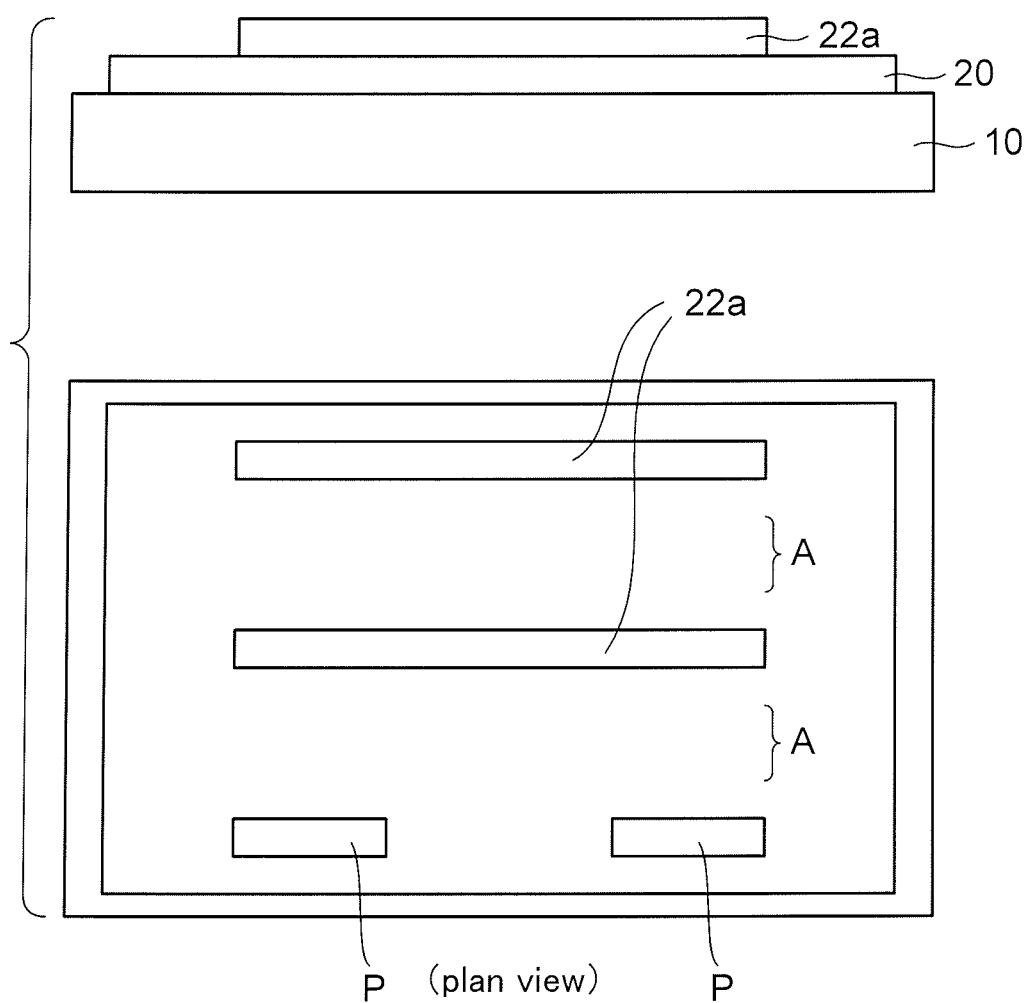

Then, as depicted in FIG. 3B, a photosensitive resin layer (not shown) for obtaining a first light path core layer is formed on the first cladding layer 20. Then, the photosensitive resin layer is exposed/developed based on the photolithography, and then is cured by applying the heating process at about 100 to 140° C. By this matter, first light path core layers 22a each having a first light path length are formed on the first cladding layer 20 as a belt-like pattern.

As depicted in a plan view of FIG. 3B, the belt-like first light path core layers 22a each extending in the lateral direction are arranged side by side in the longitudinal direction. A refractive index of the first light path core layers 22a is set higher than those of the first cladding layer 20 and a second cladding layer described later. A thickness of the first light path core layers 22a is set in a range from about 30 to 80 μm, for example.

In the present embodiment, the core layers with two routes, whose light path lengths are different are formed on the first cladding layer 20. Therefore, an area A for arranging the second light path core layers is ensured between a plurality of first light path core layers 22a respectively.

At the same time, alignment patterns P each formed of the identical layer with the first light path core layer 22a are formed on the first cladding layer 20. The alignment pattern P is arranged in parallel with the first light path core layers 22a, and is arranged in the areas corresponding to both end parts in the longer direction of the first light path core layer 22a respectively.

Figure 4:
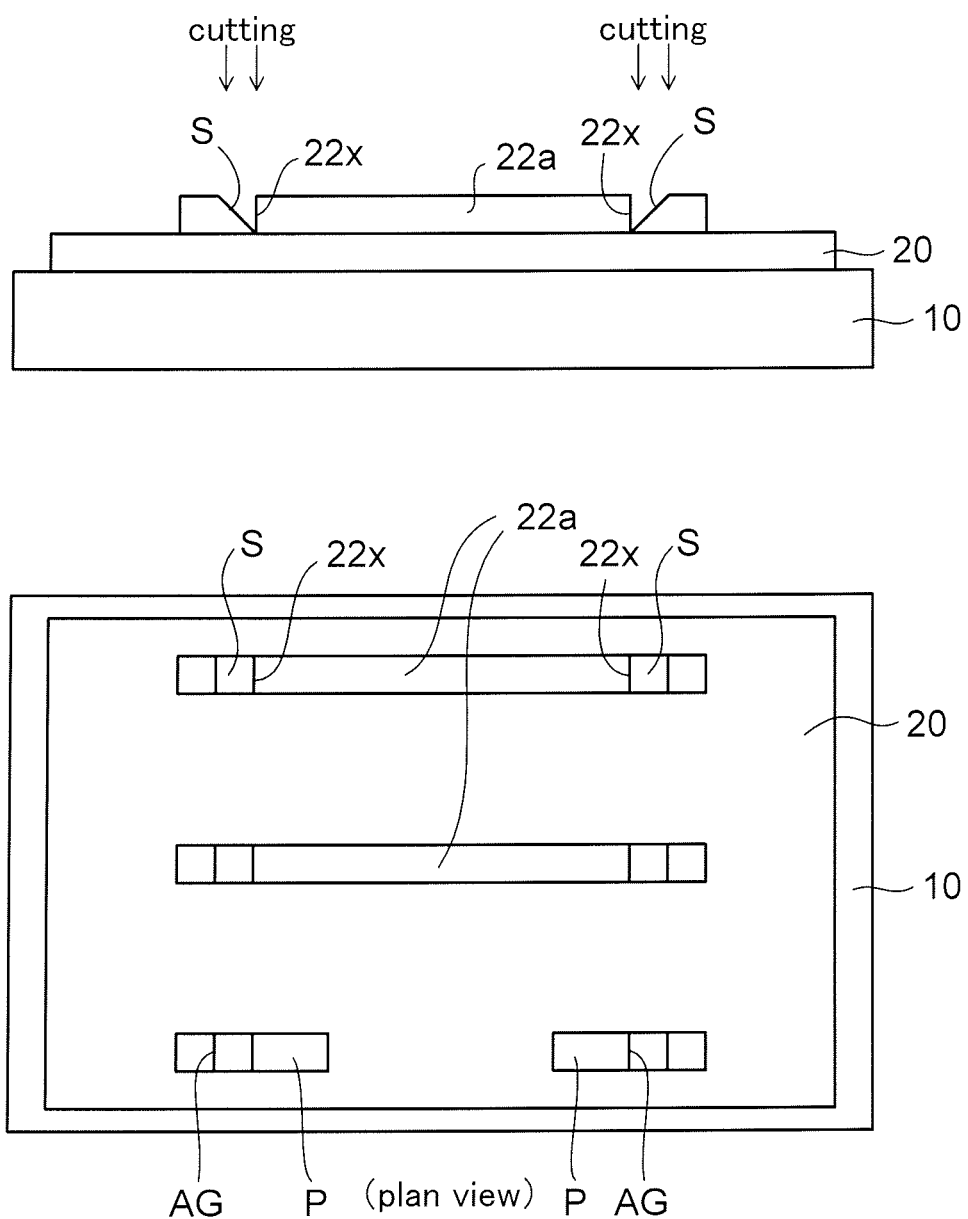
FIG. 4 is a sectional view and a plan view (#2) depicting the method of manufacturing the optical waveguide according to the first embodiment.

Then, as depicted in FIG. 4, parts of the first light path core layers 22a each serving as a light path converting portion are cut and processed by the rotary blade of the cutting device so as to be divided in the thickness direction. This cutting method is also called the dicing cut.

By this matter, a groove portion 22x having an inclined surface S is formed in both end sides of the first light path core layers 22a respectively. The inclined surface S is formed such that this inclined surface is inclined at a predetermined angle (preferably, 45°) to the extending direction (light propagation direction) of the first light path core layer 22a to intersect with it.

At the same time, an alignment groove portion AG is formed in positions of the alignment patterns P, which correspond to the groove portions 22x of the first light path core layers 22a by the rotary blade. The alignment groove portions AG are processed to have the identical shape with the groove portion 22x of the first light path core layer 22a.

The groove portions 22x and the alignment groove portions AG may be formed to divide the first light path core layers 22a and further may be formed up to the middle point of a thickness of the first cladding layer 20.

Figure 5:
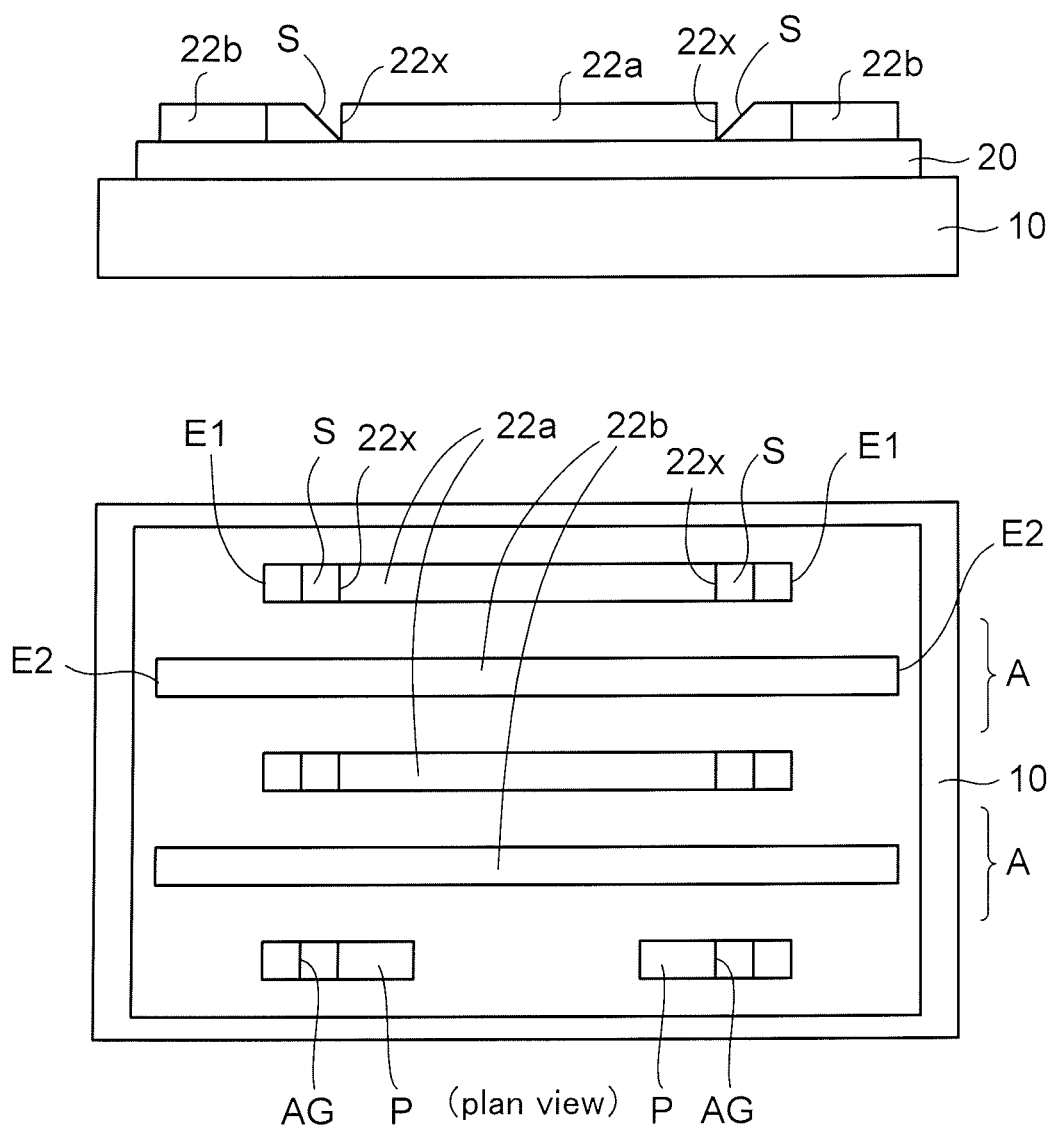
FIG. 5 is a sectional view and a plan view (#3) depicting the method of manufacturing the optical waveguide according to the first embodiment.

Then, as depicted in FIG. 5, a photosensitive resin layer (not shown) for obtaining the second light path core layers is formed on the first cladding layer 20 and the first light path core layers 22a. Then, the photosensitive resin layer is exposed/developed via a photo mask based on the photolithography, and then is cured by applying the heating process at about 100 to 140° C.

By this matter, a second light path core layer 22b is formed in the areas A between the first light path core layers 22a on the first cladding layer 20 respectively such that these second light path core layers 22b are arranged in parallel with the first light path core layers 22a. The second light path core layers 22b are formed of the identical material with the first light path core layers 22a, and an arrangement pitch at which the first light path core layer 22a and the second light path core layer 22b exist together is set to about 125 μm, for example.

In an example in FIG. 5, the first light path core layer 22a and the second light path core layer 22b are arranged side by side alternately. In this case, the second light path core layer 22b may be arranged in the lateral area of the first light path core layer 22a on the first cladding layer 20.

Also, the second light path core layer 22b is formed to have a second light path length that is longer than the first light path length of the first light path core layer 22a. Both end portions E2 of the second light path core layer 22b are arranged on the outer side than both end portions E1 of the first light path core layer 22a respectively.

In the step of forming the second light path core layers 22b, when the photo mask used in the photolithography is aligned, the alignment is performed by utilizing the alignment groove portion AG formed in the alignment pattern P described above. The alignment groove portion AG formed in the alignment pattern P is arranged in the positions corresponding to the groove portions 22x of the first light path core layer 22a.

Accordingly, both end portions E2 of the second light path core layer 22b, which are formed to be aligned by the alignment groove portion AG, are arranged in the positions located on the outer side than the groove portion 22x of the first light path core layer 22a by a predetermined dimension. That is, both end portions E2 of the second light path core layer 22b are arranged to be aligned with the groove portions 22x of the first light path core layers 22a with good precision.

Figure 6:
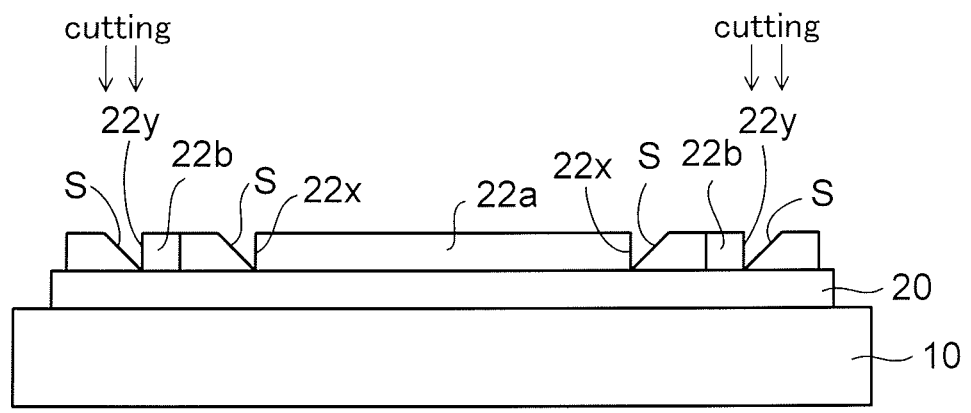
FIG. 6 is a sectional view and a plan view (#4) depicting the method of manufacturing the optical waveguide according to the first embodiment.
Figure 6:
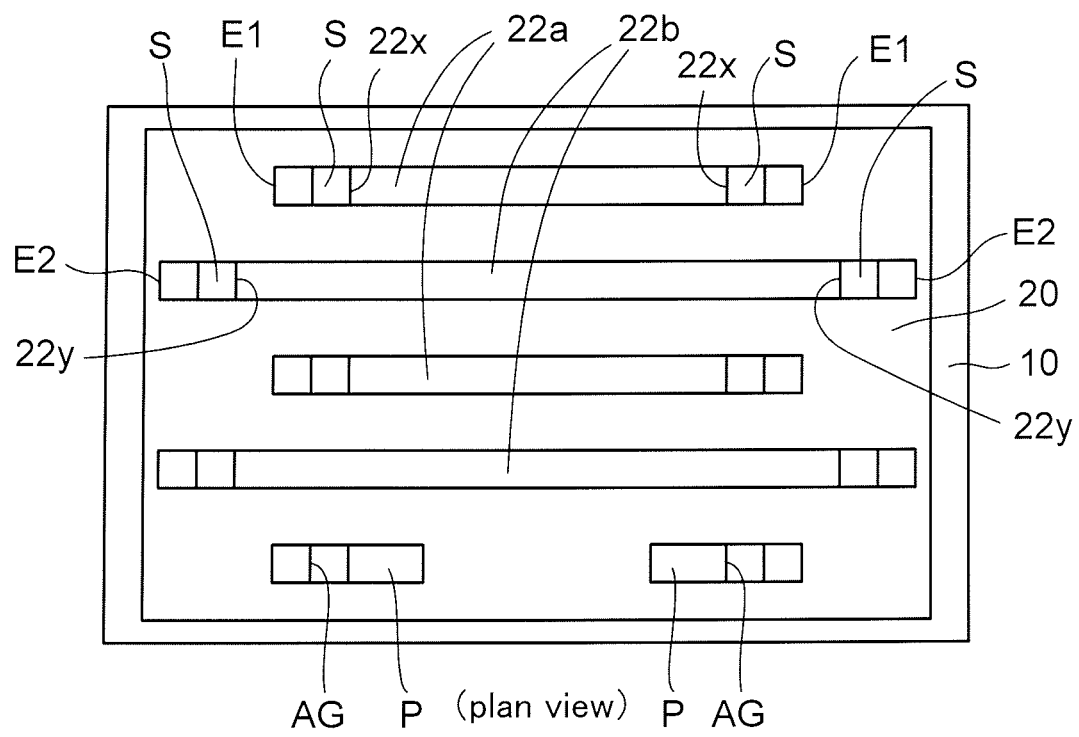

Then, as depicted in FIG. 6, both end sides of the second light path core layers 22b are processed and cut by the rotary blade of the cutting device so as to divide in the thickness direction. By this matter, like the first light path core layers 22a, a groove portion 22y having the inclined surface S is formed on both end sides of the second light path core layers 22b respectively. The inclined surface S is formed such that this inclined surface S is inclined at a predetermined angle (preferably, 45°) to the extending direction (light propagation direction) of the second light path core layer 22b to intersect with it.

A light path length of the second light path core layer 22b is set longer than a light path length of the first light path core layers 22a. The groove portions 22y of the second light path core layers 22b are arranged on the outer side than the positions of the groove portions 22x of the first light path core layers 22a.

As described above, the second light path core layers 22b are arranged to be aligned with the groove portions 22x of the first light path core layers 22a. Accordingly, by cutting predetermined positions on both end sides of the second light path core layers 22b by means of the rotary blade of the cutting device, the groove portions 22y of the second light path core layers 22b can be arranged in the outer positions than the groove portions 22x of the first light path core layers 22a by a desired dimension with good precision.

In this manner, at first, the groove portion 22x is formed on both end sides of the first light path core layers 22a in a side where light path length is shorter, and after that the groove portion 22y is formed on both end sides of the second light path core layers 22b in a side where the light path length is longer. Therefore, when the groove portions 22x are formed on the first light path core layers 22a, the second light path core layers 22b do not exist in the positions corresponding to the groove portions 22x. As a result, there is no risk that the unnecessary groove portions are formed in the second light path core layers 22b.

In FIG. 6, such an example is illustrated that the first light path core layers 22a and the second light path core layers 22b with two routes, whose light path lengths are different are formed sequentially. In this event, first to n-th light path core layers with n routes (n is an integer in excess of 2), whose light path lengths are different, can be formed sequentially.

Figure 7:
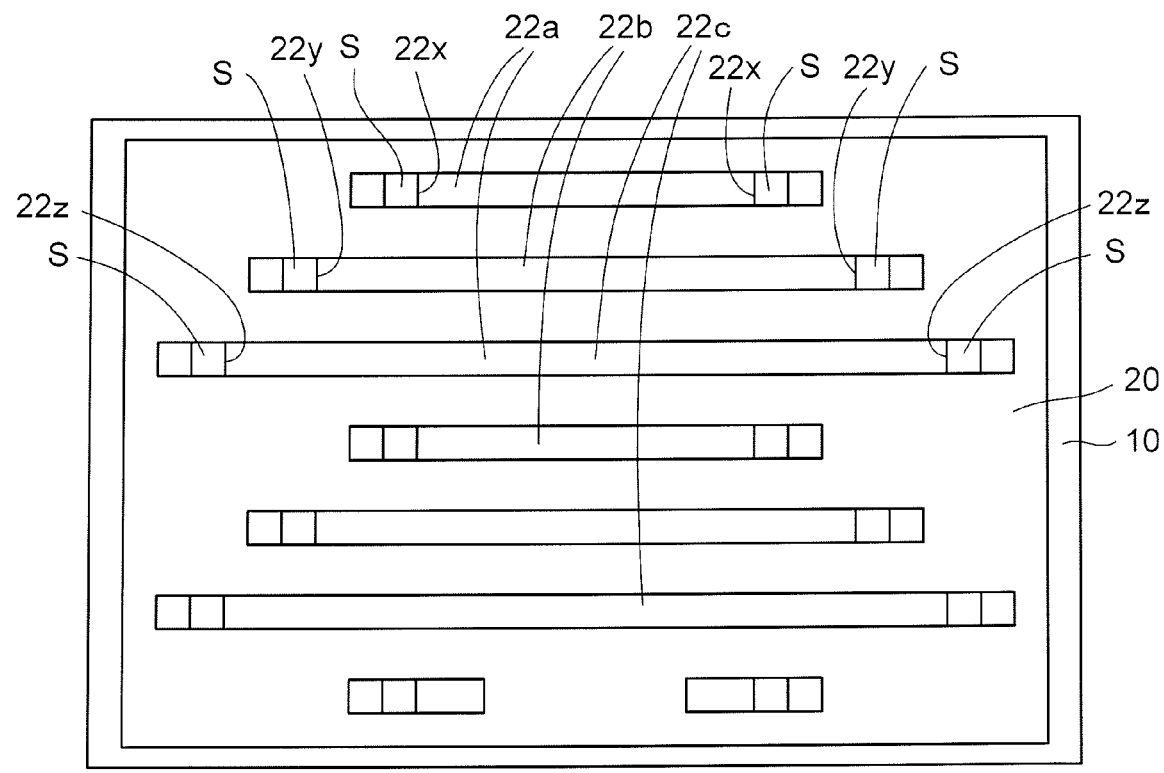
FIG. 7 is a plan view depicting an example in which the layer from a first light path core layer to a third light path core layer is formed, in the method of manufacturing the optical waveguide according to the first embodiment.

In FIG. 7, such an example is illustrated that the first light path core layers 22a, the second light path core layers 22b, and third light path core layers 22c are formed sequentially. Also in the third light path core layer 22c, a groove portion 22z having the inclined surface S is formed in the positions located to the outer side than both ends of the second light path core layer 22b.

In this manner, the serial steps for the formation of the core layers and the formation of the groove portions are repeated in sequence from the core layer whose light path length is shorter, thereby a plurality of core layers which have different light path lengths and have the groove portion (the inclined surface) on both end sides can be formed to align on the identical surface of the first cladding layer.

In the next step, a method of manufacturing the optical waveguide by using the structural body in FIG. 6 will be explained hereunder. As depicted in FIG. 8, a metal layer 30 having light reflection property is formed only on the inclined surfaces S on the groove portions 22x of the first light path core layers 22a and the inclined surfaces S on the groove portions 22y of the second light path core layers 22b respectively by the sputter method or the vapor deposition method utilizing a mask.

As the metal layer 30 having light reflection property, a gold (Au) layer, an aluminum (Al) layer, a silver (Ag) layer, or the like is used, and its thickness is set in a range from 0.2 to 0.5 µm.

The metal layer 30 formed on respective inclined surfaces S of the first light path core layers 22a and the second light path core layers 22b function as the light path conversion mirror M.

Then, as depicted in FIG. 9, a photosensitive resin layer (not shown) for obtaining a second cladding layer is formed on the first cladding layer 20, the first light path core layers 22a, the second light path core layers 22b, and the metal layers 30.

Then, the photosensitive resin layer is exposed/developed based on the photolithography, and then is cured by applying the heating process at about 100 to 140° C. By this matter, a second cladding layer 24 covering the first light path core layers 22a and the second light path core layers 22b is formed. In a plan view of FIG. 9, the second cladding layer 24 is depicted in a perspective view.

By the above, a structural body in which the first light path core layers 22a and the second light path core layers 22b are surrounded by the first cladding layer 20 and the second cladding layer 24 is obtained.

Then, as depicted in FIG. 10, the lower surface of the first cladding layer 20 is exposed by removing the substrate 10 from the structural body in FIG. 9. The substrate 10 is formed of a polycarbonate resin, or the like, and can be easily removed by peeling off along the boundary to the first cladding layer 20.

By the above, an optical waveguide 1 of the present embodiment can be obtained. Here, the substrate 10 may not be removed, and the structural body including the substrate 10 may be used as the optical waveguide.

As explained above, in the method of manufacturing the optical waveguide according to the first embodiment, such a technique is employed that at first the groove portion 22x (the inclined surface S) is formed to both end sides of the first light path core layers 22a in a side where the light path length is shorter, then the second light path core layers 22b in a side where the light path length is longer are formed on the identical surface of the first cladding layer 20, and then the groove portion 22y (the inclined surface S) is formed to both end sides of the second light path core layers 22b.

Unlike the present embodiment, in the case that the core layers with two routes, whose light path lengths are different are formed simultaneously on the substrate, when the groove portions are formed in the core layers in a side where the light path length is shorter, the groove portions are also formed in the corresponding positions of the core layers in a side where the light path length is longer. Therefore, the core layers in a side where the light path length is longer do not function.

In the present embodiment, the formation of the core layers and the formation of the groove portions are performed in sequence from the core layers in a side where the light path length is shorter, thus the groove portions are aligned sequentially from the inner side to the outer side. As a result, the core layers with plural routes, whose light path lengths are different can be formed to align on the identical surface of the first cladding layer 20 without stacking them.

As depicted in FIG. 10, in the optical waveguide 1 of the first embodiment, the first light path core layers 22a and the second light path core layers 22b are arranged side by side on the identical surface of the first cladding layer 20. The second light path core layers 22b are arranged in the areas between the first light path core layers 22a in parallel with the first light path core layers 22a. A light path length of the second light path core layers 22b is set longer than a light path length of the first light path core layers 22a.

The groove portion 22x having the inclined surface S is formed on both end sides of the first light path core layers 22a respectively. Also, the groove portion 22y having the inclined surface S is formed on both end sides of the second light path core layers 22b respectively. The groove portions 22y of the second light path core layers 22b are arranged in the positions located on the outer side than the groove portions 22x of the first light path core layers 22a.

Also, the second cladding layer 24 covering the first light path core layers 22a and the second light path core layers 22b is formed.

The optical waveguide 1 of the first embodiment is manufactured by the above-mentioned manufacturing method. Therefore, the first light path core layers 22a and the second light path core layers 22b, with two routes, and both of which have the light path conversion mirror M in different positions, can be arranged to align on the identical surface of the first cladding layer 20 without stacking them.

For this reason, as described latter, in the optical devices (the light emitting element and the light receiving element) which are optically coupled to the first light path core layer 22a and the second light path core layer 22b, both of them, the light path to the light path conversion mirrors M can be set shortest respectively. As a result, an increase of an optical coupling loss can be avoided, and enough reliability of the optical characteristics can be obtained.

Next, an optical waveguide device using the optical waveguide 1 according to the first embodiment will be explained hereunder.

Figure 11:
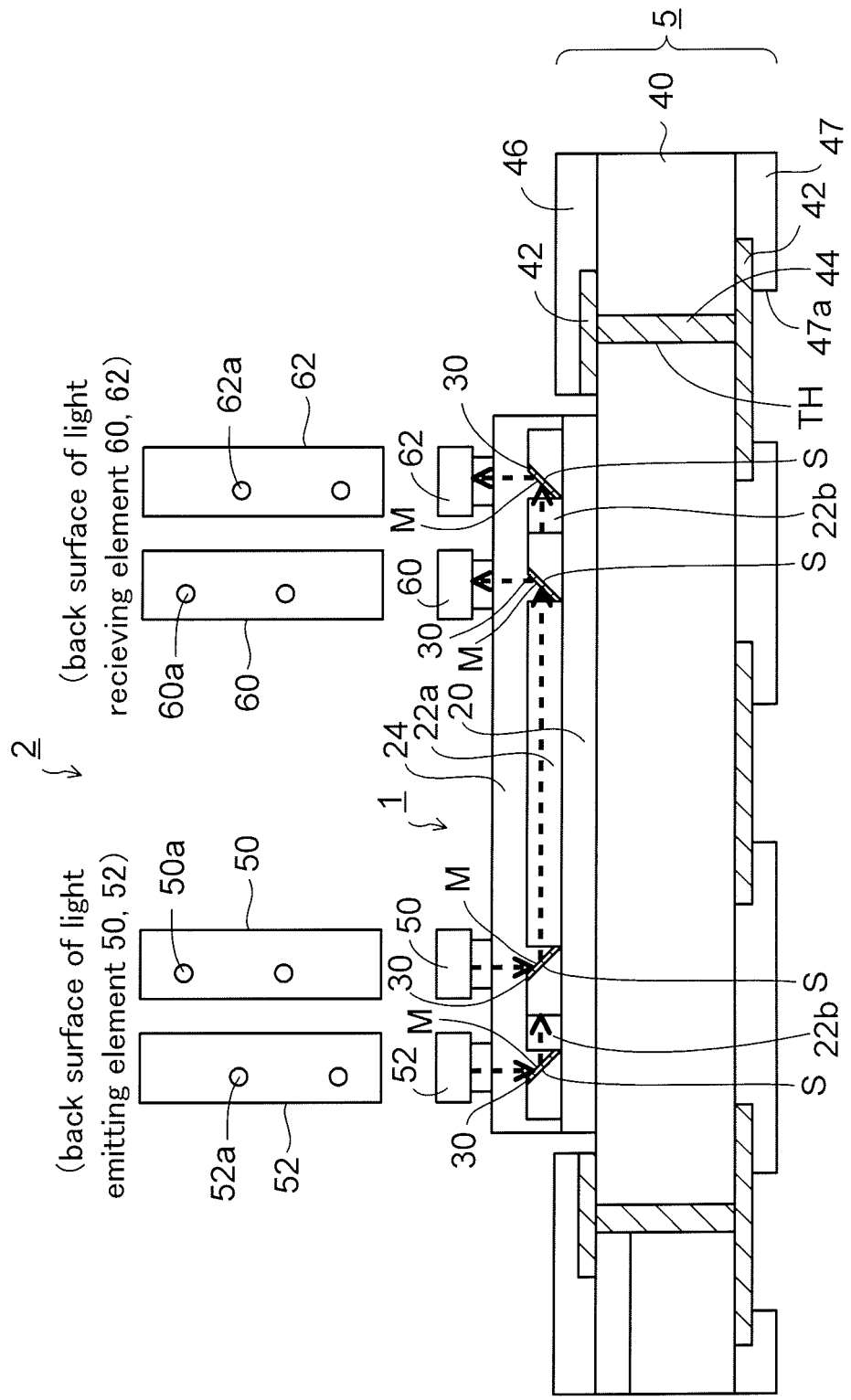
FIG. 11 is a sectional view and a plan view (#1) depicting an optical waveguide device according to the first embodiment.

In FIG. 11, a first optical waveguide device 2 according to the first embodiment is depicted. As depicted in FIG. 11, in the first optical waveguide device 2, the outside surface of the first cladding layer 20 of the optical waveguide 1 in FIG. 10 described above is adhered onto a wiring substrate 5 and is arranged thereon. In the wiring substrate 5, a wiring layer 42 serving as an electric wiring is formed on both surface sides of an insulating substrate 40 made of a glass epoxy resin, or the like, respectively.

Through holes TH are provided in the insulating substrate 40, and a penetration electrode 44 obtained by filling metal in the through holes TH is formed. The wiring layers 42 on both surface sides are connected mutually via the penetration electrodes 44. Then, a solder resist 46 is formed like a frame shape on the peripheral part of the upper surface side of the insulating substrate 40.

Also, a solder resist 47 in which an opening portion 47a is formed on connection parts of the wiring layers 42 respectively, is formed on the lower surface side of the insulating substrate 40. The connection parts of the wiring layers 42 on the lower surface side of the insulating substrate 40 may be used as external connection lands, or external connection terminals which protrude toward the outside may be provided by mounting a solder ball, or the like on the connection parts of the wiring layers 42 respectively.

A rigid substrate is illustrated as the wiring substrate 5, but a flexible substrate using a polyimide film, or the like as a substrate may be used.

Then, a first light emitting element 50 is mounted to be connected to connection pads (not shown) of the wiring substrate 5 such that this first light emitting element 50 is optically coupled to the light path conversion mirrors M on one end side (left side) of the first light path core layers 22a of the optical waveguide 1. A plurality of light emitting portions 50a are provided on the back surface of the first light emitting element 50, and the respective light emitting portions 50a are optically coupled to the light path conversion mirrors M of the respective first light path core layers 22a.

Also, a first light receiving element 60 is mounted to be connected to connection pads (not shown) of the wiring substrate 5 such that this first light receiving element 60 is optically coupled to the light path conversion mirrors M on the other end side (right side) of the first light path core layers 22a of the optical waveguide 1. A plurality of light receiving portions 60a are provided on the back surface of the first light receiving element 60, and the respective light receiving portions 60a are optically coupled to the light path conversion mirrors M of the respective first light path core layers 22a.

Also, a second light emitting element 52 is mounted to be connected to connection pads (not shown) of the wiring substrate 5 such that this second light emitting element 52 is optically coupled to the light path conversion mirrors M on one end side (left side) of the second light path core layers 22b of the optical waveguide 1. A plurality of light emitting portions 52a are provided on the back surface of the second light emitting element 52, and the respective light emitting portions 52a are optically coupled to the light path conversion mirrors M of the respective second light path core layers 22b.

Also, a second light receiving element 62 is mounted to be connected to connection pads (not shown) of the wiring substrate 5 such that this second light receiving element 62 is optically coupled to the light path conversion mirrors M on the other end side (right side) of the second light path core layers 22b of the optical waveguide 1. A plurality of light receiving portions 62a are provided on the back surface of the second light receiving element 62, and the respective light receiving portions 62a are optically coupled to the light path conversion mirrors M of the respective second light path core layers 22b.

As the first light emitting element 50 and the second light emitting element 52, the surface light emitting laser (VCSEL: Vertical Cavity Surface Emitting Laser) is used preferably. Also, as the first light receiving element 60 and the second light receiving element 62, the photodiode is used preferably.

An underfill resin (not shown) formed of either the identical resin with the second cladding layer 24 or a resin whose refractive index of light is equal to the second cladding layer 24 may be filled into respective clearances located under the first and second light emitting elements 50, 52 and the first and second light receiving elements 60, 62.

In the first optical waveguide device 2 of the present embodiment, an electric signal which is output from a first LSI chip (a driver, or the like)(not shown) is supplied to the first light emitting element 50, and then a light is emitted downward from the first light emitting element 50.

A light emitted from the first light emitting element 50 arrives at the light path conversion mirror M on one end side of the first light path core layer 22a of the optical waveguide 1. Then, the light is reflected by the light path conversion mirror M (metal layer 30) and a light path is converted by 90°, and then the light is entered to first light path core layer 22a.

Then, the light entered to the first light path core layer 22a propagates through the first light path core layer 22a while repeating a total reflection, and arrives at the light path conversion mirror M on the other end side. Then, the light is reflected by the light path conversion mirror M (the metal layer 30) on the other end side and the light path is converted by 90°, and the light is entered to the first light receiving element 60. The first light receiving element 60 converts the light signal into the electric signal, and then the electric signal is supplied to a second LSI chip (a memory, or the like) (not shown).

Also similarly, the electric signal is supplied to the second light emitting element 52, and the light is emitted downward from the second light emitting element 52. The light emitted from the second light emitting element 52 arrives at the light path conversion mirror M on one end side of the second light path core layer 22b of the optical waveguide 1. Then, the light is reflected by the light path conversion mirror M (the metal layer 30) and the light path is converted by 90°, and then the light is entered to the second light path core layer 22b.

Then, the light entered to the second light path core layer 22b propagates through the second light path core layer 22b while repeating a total reflection, and arrives at the light path conversion mirror M on the other end side. Then, the light is reflected by the light path conversion mirror M (the metal layer 30) on the other end side and the light path is converted by 90°, and then the light is entered to the second light receiving element 62.

In the first optical waveguide device 2 of the present embodiment, the optical waveguide 1 with two routes, which has the desired characteristic, and the light path conversion mirrors M arranged with good positional precision are provided. Therefore, the first and second light emitting elements 50, 52 and the first and second light receiving elements 60, 62 can be optically coupled to the optical waveguide 1 respectively with good reliability.

Also, in the first optical waveguide device of the present embodiment, the first light path core layers 22a and the second light path core layers 22b are formed on the identical surface of the first cladding layer 20. Therefore, both of them, respective light emitting portions 50a, 52a of the first and second light emitting elements 50, 52 and respective light receiving portions 60a, 62a of the first and second light receiving elements 60, 62 can be optically coupled to the light path conversion mirror M in a state that they are made to come close to the light path conversion mirror M.

Accordingly, an increase of an optical coupling loss generated in the first and second light emitting elements 50, 52 and the first and second light receiving elements 60, 62 can be avoided, and enough reliability of the optical characteristics can be obtained.

Figure 12:
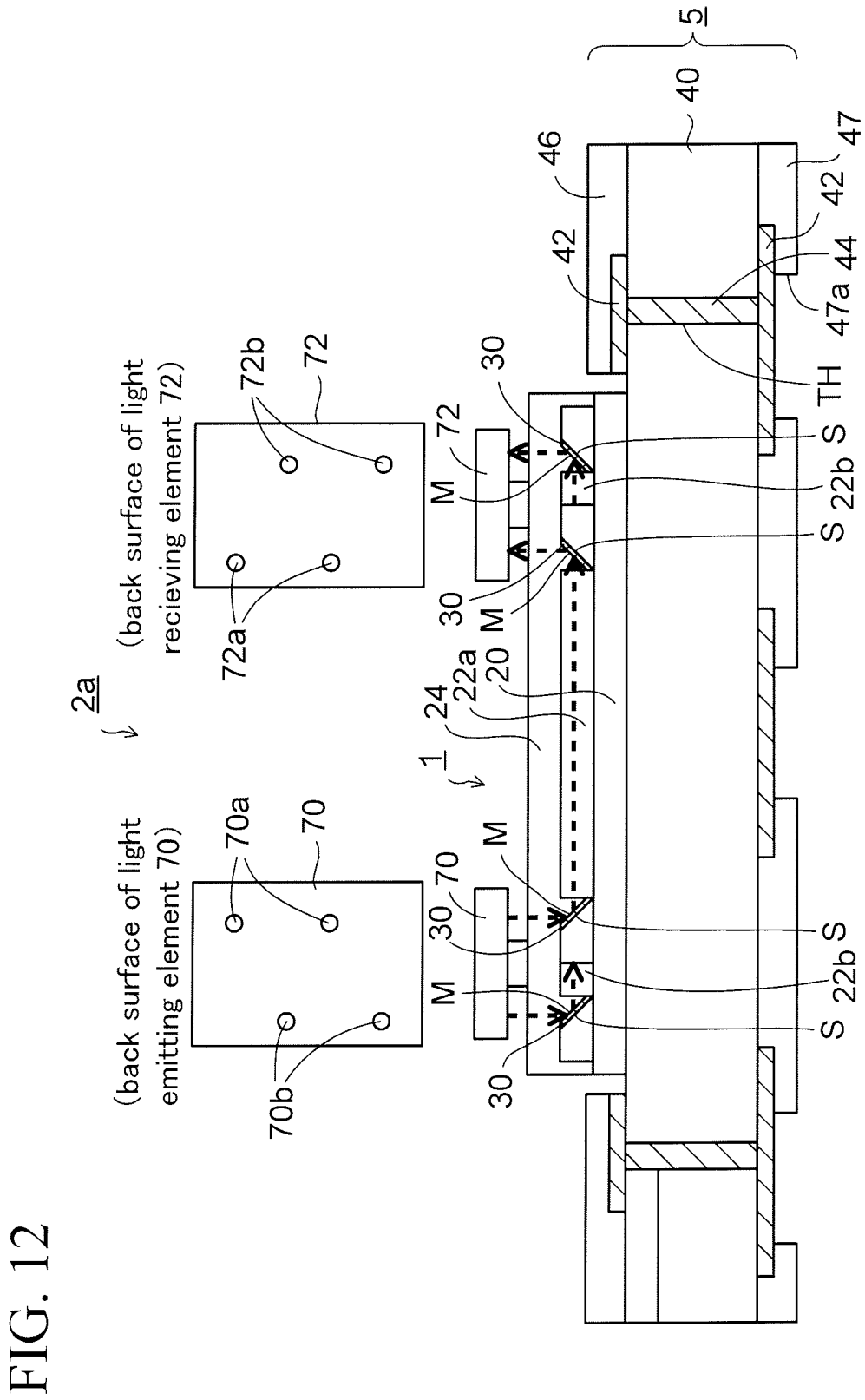
FIG. 12 is a sectional view and a plan view (#2) depicting an optical waveguide device according to the first embodiment.

In FIG. 12, a second optical waveguide device 2a according to the first embodiment is depicted. In the second optical waveguide device 2a, a light emitting element 70 in which the light emitting portions (first light emitting portions 70a and second light emitting portions 70b) with plural rows are built-in is mounted on the wiring substrate such that this light emitting element 70 is optically coupled to the optical waveguide 1.

The first light emitting portions 70a of the light emitting element 70 are arranged side by side with one row so as to correspond to the light path conversion mirrors M formed on one end sides (left sides) of the first light path core layers 22a of the optical waveguide 1. Also, the second light emitting portions 70b of the light emitting element 70 are arranged side by side with one row so as to correspond to the light path conversion mirrors M formed on one end sides (left sides) of the second light path core layers 22b of the optical waveguide 1.

Also, a light receiving element 72 in which the light receiving portions (first light receiving portions 72a and second light receiving portions 72b) with plural rows are built-in is mounted on the wiring substrate 5 such that this light receiving element 72 is optically coupled to the optical waveguide 1. The first light receiving portions 72a of the light receiving element 72 are arranged side by side with one row so as to correspond to the light path conversion mirrors M formed on the other end sides (right sides) of the first light path core layers 22a of the optical waveguide 1.

Also, the second light receiving portions 72b of the light receiving element 72 are arranged side by side with one row so as to correspond to the light path conversion mirrors M formed on the other end sides (right sides) of the second light path core layers 22b of the optical waveguide 1.

An underfill resin (not shown) formed of either the identical resin with the second cladding layer 24 or a resin whose refractive index of light is equal to the second cladding layer 24 may be filled into respective clearances located under the light emitting element 70 and the light receiving element 72.

Then, the lights emitted from the first light emitting portions 70a of the light emitting element 70 are entered to the first light receiving portions 72a of the light receiving element 72 via the similar light paths to those of the first light emitting element 50 of the first optical waveguide device 2 described above.

Also, the lights emitted from the second light emitting portions 70b of the light emitting element 70 are entered to the second light receiving portions 72b of the light receiving element 72 via the similar light paths to those of the second light emitting element 52 of the first optical waveguide device 2 described above.

Also in the second optical waveguide device 2a, both of them, the first and second light emitting portions 70a, 70b of the light emitting element 70 and the first and second light receiving portions 72a, 72b of the light receiving element 72 can be optically coupled to the light path conversion mirror M in a state that they are made to come close to the light path conversion mirror M. As a result, an increase of an optical coupling loss can be avoided, and enough reliability of the optical characteristics can be obtained.

Second Embodiment

Figure 13:
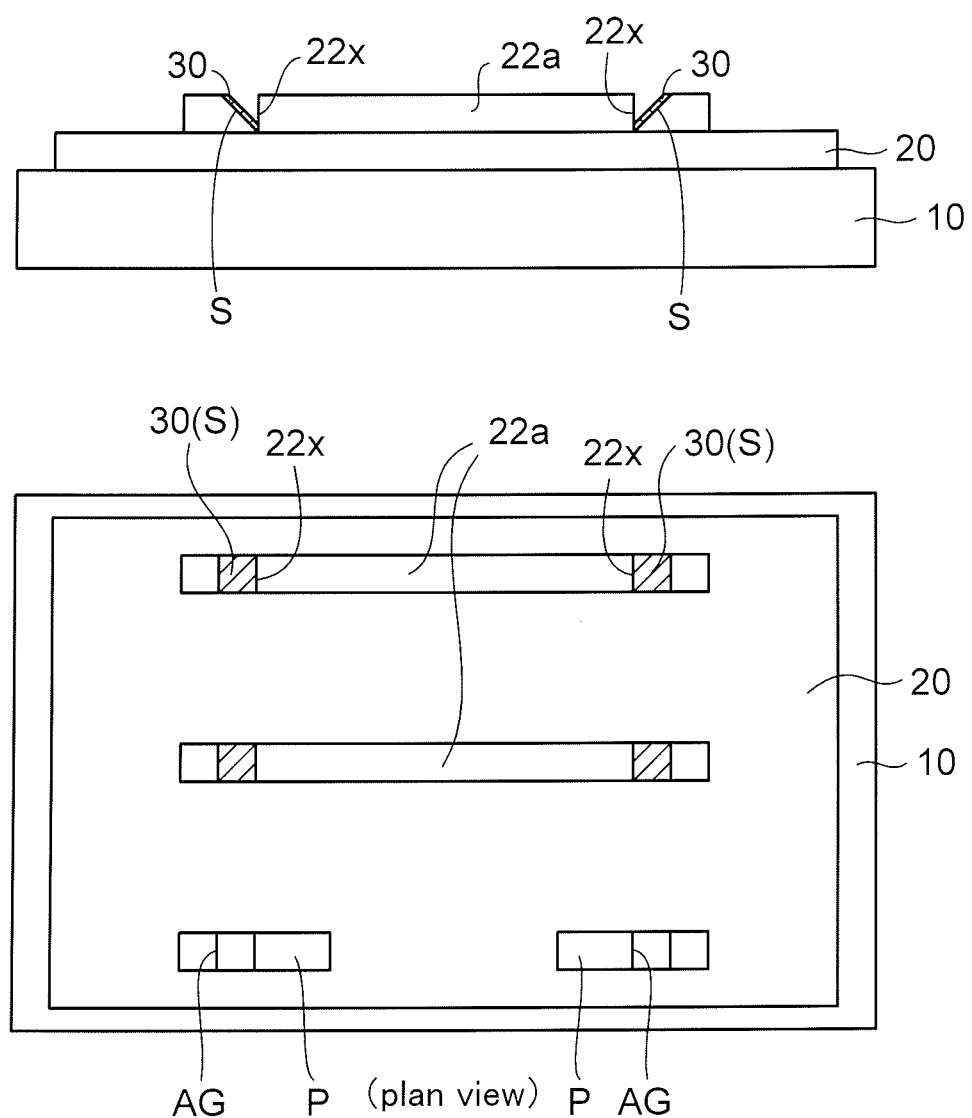
FIG. 13 is a sectional view and a plan view (#1) depicting a method of manufacturing an optical waveguide according to a second embodiment.
Figure 14:
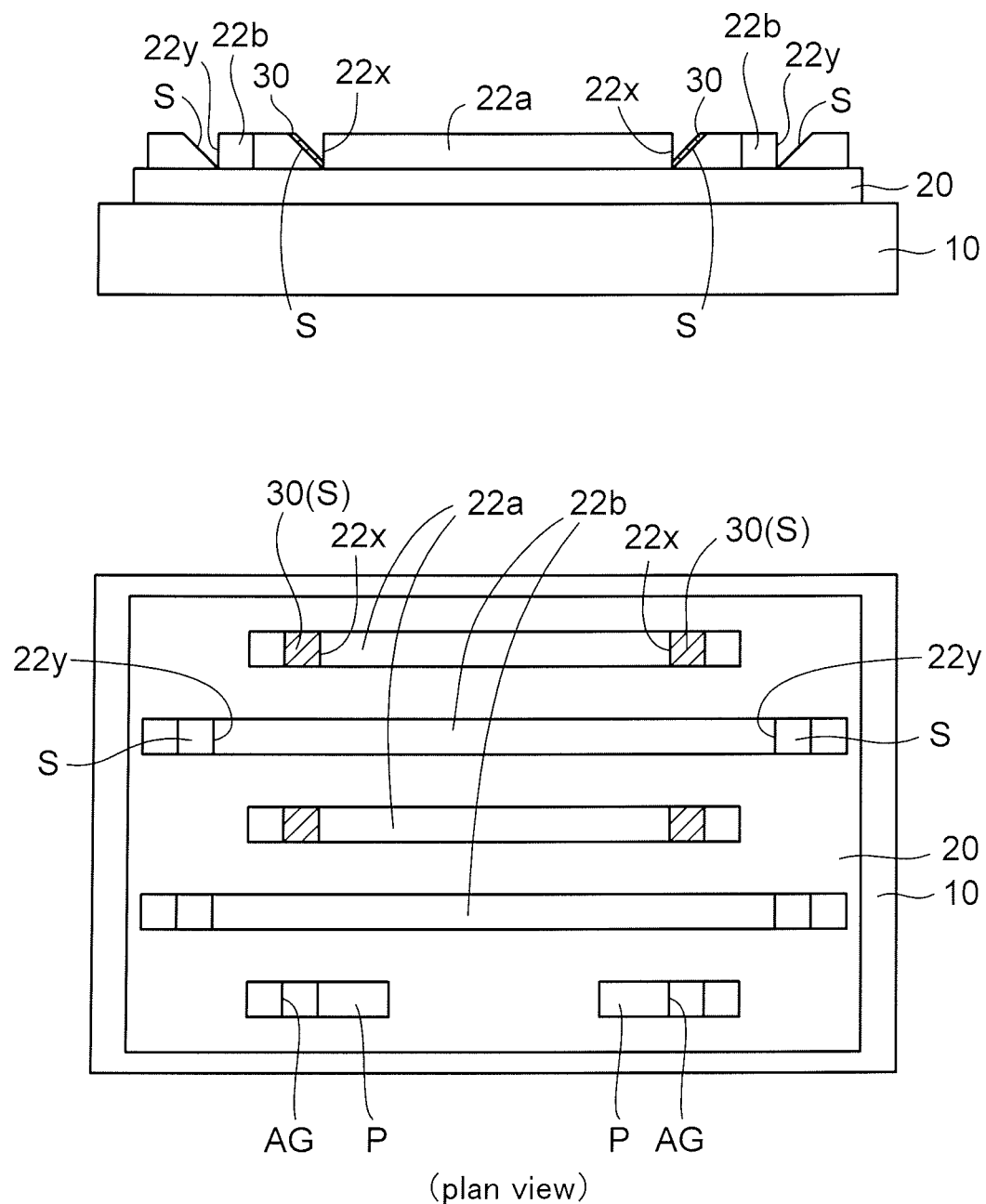
FIG. 14 is a sectional view and a plan view (#2) depicting the method of manufacturing the optical waveguide according to the second embodiment.
Figure 15:
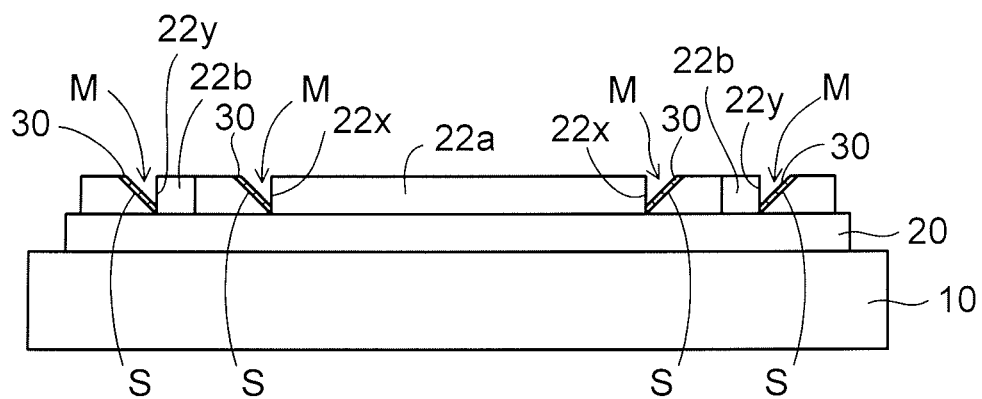
FIG. 15 is a sectional view and a plan view (#3) depicting the method of manufacturing the optical waveguide according to the second embodiment.
Figure 15:
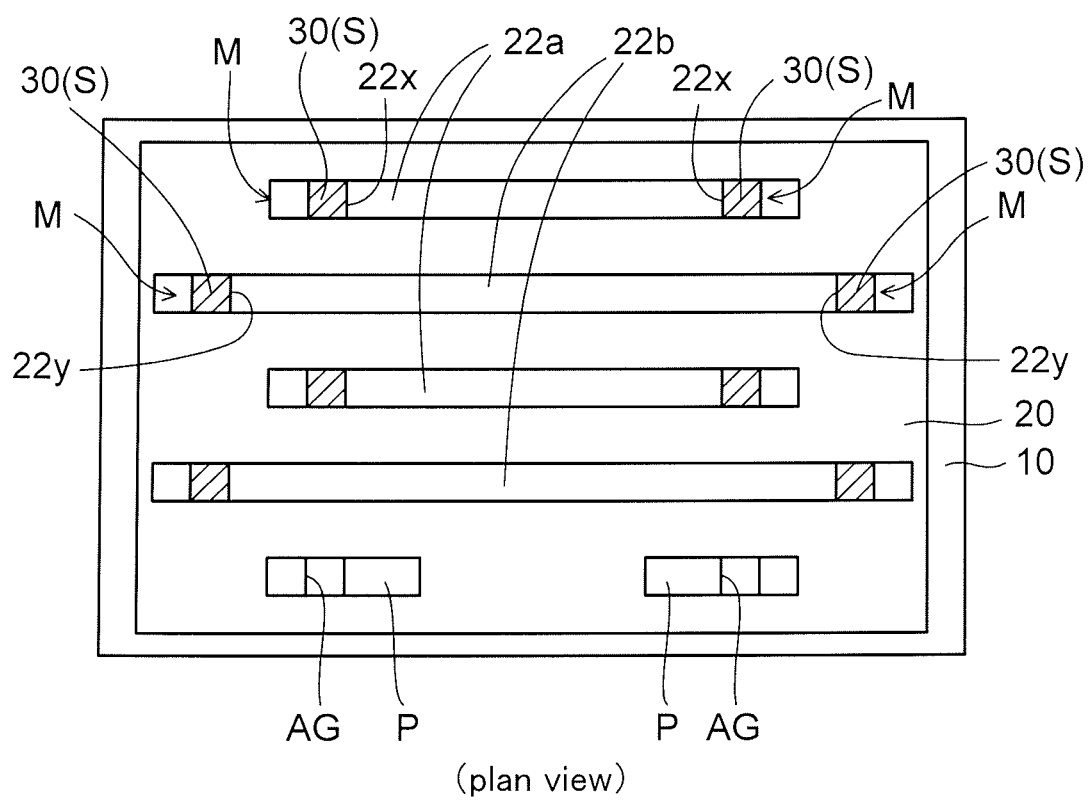

FIG. 13 to FIG. 15 are sectional views and plan views depicting a method of manufacturing an optical waveguide according to a second embodiment. In the first embodiment described above, the light path conversion mirrors M are obtained by forming collectively the metal layer 30 on respective inclined surfaces S of the groove portions 22x, 22y of the first light path core layers 22a and the second light path core layers 22b. In this second embodiment, at first respective core layers are formed, and after that the metal layer is formed individually on the inclined surfaces of the grove portions of respective core layers.

In the second embodiment, the same reference symbols are affixed to the same steps and the same elements as those in the first embodiment, and their detailed explanation will be omitted herein.

In the method of manufacturing the optical waveguide of the second embodiment, as depicted in FIG. 13, the structural body obtained in the steps in FIG. 4 described above is made, and prior to the formation of the second light path core layers, the metal layer 30 having light reflection property is formed on the inclines surfaces S of the groove portions 22x of the first light path core layers 22a by the mask vapor deposition, or the like. Thus, the light path conversion mirrors M are obtained.

Then, as depicted in FIG. 14, according to the same method as that in the first embodiment, the second light path core layer 22b is formed in the areas between the first light path core layer 22a. Then, the groove portion 22y having the inclined surface S is formed in both end parts of the second light path core layers 22b respectively.

Then, as depicted in FIG. 15, the metal layer 30 having light reflection property is formed partially on the inclined surfaces S of the groove portions 22y of the second light path core layers 22b by the mask vapor deposition, or the like. Thus, the light path conversion mirrors M are obtained.

By this matter, the identical structural body as that depicted in FIG. 8 of the first embodiment is obtained. Then, the identical optical waveguide with the optical waveguide 1 of the first embodiment is obtained by performing the steps in FIG. 9 and FIG. 10 in the first embodiment.

Also in the method of manufacturing the optical waveguide of the second embodiment, the similar advantages to those of the first embodiment can be achieved. In addition to this, in the second embodiment, the metal layer 30 is formed individually on the inclined surfaces S of the first light path core layers 22a and the second light path core layers 22b. Therefore, the metal material of the metal layer and the stacked structure can be changed every core layer in respective routes, and thus the light path conversion mirror most suitable for respective core layers can be formed.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of manufacturing an optical waveguide, comprising:
    forming a first light path core layer having a first light path length on a first cladding layer;
    forming a groove portion having an inclined surface in an end side of the first light path core layer;
    forming a second light path core layer having a second light path length which is longer than the first light path length, in a lateral area of the first light path core layer on the first cladding layer;
    forming a groove portion having an inclined surface, which is arranged to an outer side than the groove portion of the first light path core layer, in an end side of the second light path core layer;
    forming a metal layer having light reflection property on the respective inclined surfaces of the first light path core layer and the second light path core layer to obtain a light path conversion mirror; and
    forming a second cladding layer covering the first light path core layer and the second light path core layer,
    wherein the first light path core layer and the second light path core layer are formed by patterning a photosensitive resin layer by means of photolithography,
    wherein in the forming of the first light path core layer, an alignment pattern which is formed of an identical layer with the first path core layer and is arranged in parallel with the first light path core layer is formed simultaneously,
    wherein in the forming of the groove portion in the first light path core layer, an alignment groove portion is formed simultaneously in a position of the alignment pattern corresponding to the groove portion which is formed in the first light path core layer, and
    wherein in the forming of the second light path core layer, a photo mask used in the photolithography is aligned by utilizing the alignment groove portion.

2. A method of manufacturing an optical waveguide, according to claim 1, wherein the second light path core layer is formed in an area between a plurality of first light path core layers.

3. A method of manufacturing an optical waveguide, comprising:
    forming a first light path core layer having a first light path length on a first cladding layer;
    forming a groove portion having an inclined surface in an end side of the first light path core layer;
    forming a metal layer having light reflection property on the inclined surface of the first light path core layer to obtain a light path conversion mirror;
    forming a second light path core layer having a second light path length which is longer than the first light path length, in a lateral area of the first light path core layer on the first cladding layer;
    forming a groove portion having an inclined surface, which is arranged to an outer side than the groove portion of the first light path core layer, in an end side of the second light path core layer;
    forming a metal layer having light reflection property on the inclined surface of the second light path core layer to obtain a light path conversion mirror; and
    forming a second cladding layer covering the first light path core layer and the second light path core layer,
    wherein the first light path core layer and the second light path core layer are formed by patterning a photosensitive resin layer by means of photolithography,
    wherein in the forming of the first light path core layer, an alignment pattern which is formed of an identical layer with the first light path core layer and is arranged in parallel with the first light path core layer is formed simultaneously,
    wherein in the forming of the groove portion in the first light path core layer, an alignment groove portion is formed simultaneously in a position of the alignment pattern corresponding to the groove portion which is formed in the first light path core layer, and
    wherein in the forming of the second light path core layer, a photo mask used in the photolithography is aligned by utilizing the alignment groove portion.

* * * * *